United States Patent [19]
Cox

[11] Patent Number: 5,393,417
[45] Date of Patent: Feb. 28, 1995

[54] WATER REMEDIATION AND PURIFICATION SYSTEM AND METHOD

[76] Inventor: Dale W. Cox, 600 Lairport St., El Segundo, Calif. 90245

[21] Appl. No.: 151,870

[22] Filed: Nov. 15, 1993

Related U.S. Application Data

[63] Continuation-in-part of Ser. No. 843,389, Mar. 2, 1992, Pat. No. 5,326,389.

[51] Int. Cl.$^6$ .............................. C02F 9/00; C02F 1/32
[52] U.S. Cl. ..................................... 210/96.1; 210/97;
210/103; 210/137; 210/194; 210/259;
210/257.1; 210/266; 210/669; 210/748;
210/742; 210/743; 210/909; 422/24; 422/127;
422/186.3; 138/45; 138/46
[58] Field of Search ................ 210/748, 96.1, 97, 103,
210/137, 739, 742, 743, 194, 259, 257.1, 266,
669, 908, 909; 422/24, 186.3, 127, 128; 138/45,
46

[56] References Cited

U.S. PATENT DOCUMENTS

| | | |
|---|---|---|
| 1,249,601 | 12/1917 | Ferrauti . |
| 2,434,835 | 1/1948 | Colley . |
| 2,518,625 | 8/1950 | Langstaf . |
| 2,587,188 | 2/1952 | McFadden . |
| 2,590,215 | 3/1952 | Sausa . |
| 2,633,154 | 3/1953 | Eastman . |
| 2,735,642 | 2/1956 | Norman . |
| 2,911,787 | 11/1959 | Barry . |
| 3,017,903 | 1/1962 | Steffens . |
| 3,236,263 | 2/1966 | Holderen . |
| 3,244,199 | 4/1966 | Hayes . |
| 3,353,560 | 11/1967 | McCalloch . |
| 3,685,786 | 8/1972 | Woodson . |
| 3,724,503 | 4/1973 | Cooke . |
| 3,791,764 | 2/1974 | Summer . |
| 3,949,025 | 4/1976 | Englert . |
| 4,076,617 | 2/1978 | Bybel . |
| 4,586,873 | 5/1986 | Leppetre . |
| 4,906,387 | 3/1990 | Pisani . |
| 4,961,860 | 10/1990 | Masri . |
| 4,983,189 | 1/1991 | Peterson . |
| 4,990,260 | 2/1991 | Pusani . |

Primary Examiner—Thomas M. Lithgow
Attorney, Agent, or Firm—Allen A. Dicke, Jr.

[57] ABSTRACT

The water remediation and purification apparatus includes a cavitation nozzle which is operated with a throat size and pressure drop to incur cavitation in the water. The explosive and implosive bubble growth and collapse produces free radicals which interact with contaminants in the water to oxidize the contaminants. The cavitation process is enhanced by (1) a variable throat nozzle, (2) recycling the product back through the nozzle for further oxidation, and (3) programmable control feedback. Subsequent ultraviolet radiation from high energy lamps, ion exchange and/or degassifying treatment can be employed to produce water quality within acceptable levels.

9 Claims, 3 Drawing Sheets

WATER REMEDIATION AND PURIFICATION SYSTEM AND METHOD

CROSS-REFERENCE

This application is a continuation-in-part of my prior application, Ser. No. 07/843,389, filed Mar. 28, 1992, for "Water Remediation and Purification Method and Apparatus," now U.S. Pat. No. 5,326,389.

FIELD OF THE INVENTION

This invention is directed to a method and apparatus for the remediation and purification of water by means of oxidation of the contaminants therein. Oxidation is produced by action of a cavitation nozzle which may be enhanced by having a variable throat to optimize cavitation conditions for particular contaminants, flow and pressure. Oxidation is further continued by the use of high energy ultraviolet radiation and/or hydrogen peroxide injection.

BACKGROUND OF THE INVENTION

There is increasing knowledge of the danger to future humanity of the discharge of contaminated water into the subsurface water table, rivers or into the sea. Accordingly, efforts are being made to remove various contaminants from water before it is reused or discharged. If such water is not reused, it is considered a waste stream which is leaving a processing area and is processed before being disposed of by discharge into the underground basin, rivers, or the sea. A number of processes have been employed to attempt to clarify water waste streams. However, in the case of already contaminated ground water, it is pumped to a remediation process line(s). Sometimes the contaminants are in the form of organic contaminants, from a wide range of hydrocarbons, to bacteria, such as salmonella and *E. Coli*. Other times, inorganics are included. The principal components of such contaminants are carbon and hydrogen. One important way for the purification of hydrocarbon-containing water waste streams is the oxidation of the organic contaminants. When the carbon and hydrogen are oxidized, the remaining materials are usually in such small concentration that they present no problem. Inorganic metals remaining after such oxidation can sometimes be converted to insoluble salts and precipitated out.

Various methods of oxidation and separation have been attempted. Oxidation has been attempted by bubbling air or substantially pure oxygen or ozone through the water waste stream, or by irradiating with ultraviolet radiation. Such oxidation attempts have been practiced at substantially ambient temperatures and, as a result, with little ionization and no temperature increase, the oxidation reaction has been limited.

When the water waste stream is pumped through a cavitation nozzle, desirable effects occur which result in ionization of the water which causes oxidation of the contaminants. However, cavitation nozzles of fixed dimension have a limited dynamic range in which they can operate at optimum conditions. Thus, there is need for improvement.

SUMMARY OF THE INVENTION

In order to aid in the understanding of this invention, it can be stated in essentially summary form that it is directed to a water remediation and purification system and method wherein the system includes a cavitation nozzle with system control so that optimum cavitation conditions can be achieved for different conditions of contaminant, pressure and flow. The system which optimizes controlled cavitation flow for the breakdown of organic contaminants operates as a process which has significantly improved conditions for the breakdown of organic contaminants. The process of utilizing the cavitation system for the breakdown of dangerous organic chemicals in ground water or industrial waste water is accomplished by optimizing the cavitation flow. The cavitation nozzle throat is preferably controlled by process parameters to optimize contaminant oxidation.

It is, thus, an object and advantage of this invention to provide a water remediation and purification method and apparatus which includes a variable cavitation nozzle so that the nozzle conditions can be changed during flow therethrough to continuously adjust cavitation conditions so that the process may be continuously optimized for maximum oxidation of contaminants.

It is another object and advantage of this invention to provide a water remediation and purification system which operates as close as possible to optimum process parameters of supply pressure to the cavitation nozzle, supply temperature, downstream pressure, flow rate, pH and amount of recirculation to substantiality oxidize organic contaminants in the inlet process stream for maximum remediation.

It is another object and advantage of this invention to provide a water remediation and purification method and apparatus which has a control system in association with a variable cavitation nozzle so that the cavitation nozzle is adjusted to optimum conditions in accordance with process parameters.

It is another object and advantage of this invention to provide a water remediation and purification method and apparatus which has a control system in association with a constant diameter throat cavitation nozzle so that the process flow is adjusted for optimum conditions in accordance with process parameters.

It is a further object and advantage of this invention to provide a water remediation and purification system and method wherein a cavitation nozzle is used to cause cavitation in the water process stream therethrough and the cavitation causes degradation of the contaminants in the stream by sonochemistry to achieve breakdown of hydrocarbon compounds with very high localized temperature and pressure.

It is another object and advantage of this invention to provide a water remediation and purification method and apparatus wherein a variable throat cavitation nozzle used for treating contaminated water is arranged in association with a recycling circuit for return of cavitation processed water and in association with a high energy ultraviolet reactor following the cavitation nozzle to further treat the processed water, the ultraviolet reactor output also arranged in association with a recycling circuit.

It is another object and advantage of this invention to provide a dwell tank at the outlet of the cavitation nozzle to permit the cavitation induced reactions to proceed before further treatment or test of the stream.

It is a further object and advantage of this invention to provide a water remediation and purification method and apparatus which includes pretreatment of a water waste stream followed by a variable cavitation nozzle which, in turn is followed by a high energy ultraviolet reactor including an ultraviolet lamp shielded by a quartz tube, and/or further water purification including ion exchange, degassification and filtering so that processed water results.

Other objects and advantages of this invention will become apparent from a study of the following portion of the specification, the claims and the attached drawings.

DESCRIPTION OF THE PREFERRED EMBODIMENT

Figure 1:
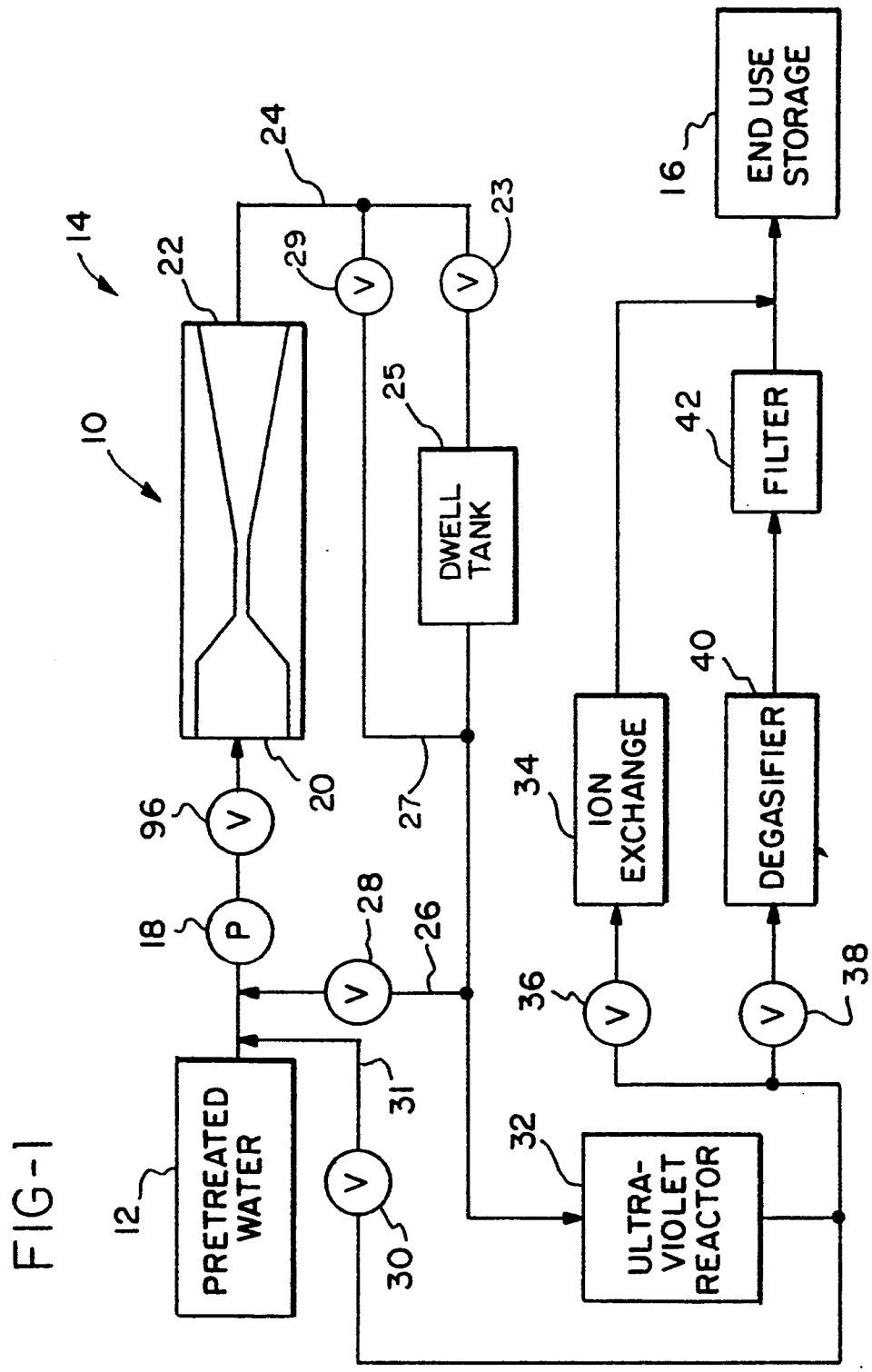
FIG. 1 is a schematic water flow diagram of a water processing system in accordance with this invention.

The system of this invention is generally indicated at 14 in FIG. 1 and includes the cavitation nozzle 10, as well as post-treatment from the cavitation treatment and delivery to an end use storage 16. The cavitation nozzle 10 is used to cause cavitation in a water waste stream passing therethrough to aid in the remediation and purification of the waste stream. As seen in FIG. 1, the waste stream originates with pretreated water coming from pretreated water source 12. The pretreatment of the water may include any one of the usual pretreatments which vary in accordance with the contaminants in the water and the intended utilization of the water. For example, the pretreatment may include flocculation and settlement, as well as anti-bacteriological treatment, free oil separator, filtration or neutralization.

Preheating the contaminant flow before the cavitation pump decreases the number of micro bubbles formed after passing through the cavitation nozzle. The higher the ambient temperature, the more vapor there will be inside the cavity. The extra vapor cushions the implosion of the cavity and lowers the temperature of the implosions. However, these changes can be beneficial for certain classes of organic chemicals being treated through hydrodynamic cavitation. The end use may be recycled into a water-utilizing process, or the end use may be the delivered into a potable water system, an underground basin, a river, or the sea. To a certain extent, the water remediation and purification method depends upon the end use to which the water is to be placed. Therefore, the treatment around the cavitation nozzle 10 is a function of the ultimate need.

The pretreated water is drawn from source 12 by pump 18, which delivers the water to the inlet 20 of nozzle 10. The water passing through the nozzle 10 is subjected to cavitation, as is described in more detail hereinafter, and the outlet of the cavitation nozzle delivers the cavitation treated water through cavitation nozzle outlet line 24. The nozzle outlet line is connected through control valve 23 to dwell tank 25, which has sufficient volume with respect to the flow rate in outlet line 24 to permit substantial completion of the reaction started by the high localized temperatures of the micro-bubble collapse during the sonochemistry. Bypass line 27 permits flow past dwell tank 25 to avoid the flow dwell therein. Control valves 23 and 29 control the proportin of flow through the dwell tank 25 to control the average dwell time of water in line 24.

Since the water in line 24 may be improved by further cavitation treatment, recycle lines 26 and 31 and recycle valves 28 and 30 are provided. A certain portion of that water in outlet line 24 thus passes again through the cavitation nozzle.

Optionally, the cavitation treatment is followed by treatment in a high energy ultraviolet reactor 32. Recycle control valve 30 controls the flow of the cavitation/ultraviolet treated water to further cavitation treatment processes. Additional treatment processes are determined by the end use of the water.

Remediation of a waste water stream by cavitation alone, including dwell and recycling, provides substantial remediation under many conditions. The present invention teaches a cavitation nozzle operated so that it "explosively" generates large quantities of micro bubbles. When these micro bubbles collapse, instantaneous pressures up to 500 atmospheres and instantaneous temperatures of about 5000 degrees K. are produced in the fluid. This phenomena accomplishes several important chemical reactions: (1) $H_2O$ disassociates into OH radicals and H+ atoms; (2) chemical bonds of complex organic hydrocarbons are broken; and (3) long chain chemicals are oxidized into simpler chemical constituents, before being irradiated downstream by ultraviolet radiation, furthering the oxidation process. The sonochemistry resulting from optimum cavitation is disclosed in an article entitled "Sonochemistry" by Kenneth S. Suslick, Science, 23 March 1990, Vol. 247, pp. 1439–1445, and an article entitled "The Temperature of Cavitation," by Flint and Suslick, Science, 20 September 1991, Vol. 253, pp. 1397–1399, the entire disclosures of which are incorporated herein by this reference.

Dwell time is an integral part of cavitational flow, particularly for cavitation only operation. Dwell time is the period of time during which the contaminant flow from the cavitation nozzle is allowed to pause in dwell tanks, thereby enabling the micro bubble collapse process and the chemical disassociation mechanism to continue toward completion. After the dwell tank, the fluid stream is pumped back through the cavitation nozzle for recycling, or is pumped forward into further processing. When the processing includes an ultraviolet reactor, then the process stream is pumped into the downstream ultraviolet reactor for further oxidation. Dwell tank time delay is a function of (1) the volume of the dwell tank, (2) the rate of flow, and (3) the proportion of flow through the dwell tank.

As an initial example of the process parameters, the system is operated so that the flow stream passing through the throat undergoes a sudden pressure reduction from approximately 70 psi inlet pressure into the nozzle throat to a vacuum of approximately 28" Hg in the nozzle throat. Downstream of the nozzle, the pressure is allowed to increase gradually as the distance from the throat increases. This overall dynamic phenomena results in cavitation in which liquid explosively produces a large number of micro-cavities. These micro-cavities then collapse producing extreme temperatures and pressure, which were measured to be approximately 5000 degrees K. and 500 atmospheres pressure. (Science, Vol. 247, page 1439, supra.) The products of hydrodynamic cavitation (hydroxyl radicals) react with the contaminants dissolved in the fluid lowering the tensile strength of the liquid, thereby enhancing the ability of the process to oxidize organic contaminants by increasing the synergistic effect between cavitated flow and ultraviolet radiation.

Remediation parameters for a 3 gpm Pilot Test Unit for contaminants such as benzene, ethyl benzene, toluene, xylene and trichloroethylene, using only a cavitation chamber and no hydrogen peroxide and no ultraviolet radiation, were determined to be most effective at a flow of 0.5 gallons per minute followed by a dwell time of 30 minutes before discharge (and sample testing). A contaminant percent reduction of 65 percent was obtained under these conditions. However, economic considerations might dictate a higher flow, less residence time and accept a lower but still adequate contaminant reduction, thereby reducing the cost of the operation. Thus, in this example, a range of flow from 0.5 to 2.0 gallons per minute by adjusting the variable throat would result in a range of reduction from 65 percent to 41 percent.

The utilization of cavitation, dwell and recycle through valve 28 are effective in reducing contaminants in the process stream. The amount of reduction is a function of the original amount of contaminant in the waste stream, the conditions in the cavitation nozzle, the dwell time and the amount of recycle through valve 28.

The amount of recycle is specified as the ratio of the normal cavitation pump output, in gallons per minute (gpm), to the effluent output in gpm. Generally, this ratio is targeted at a value above 20:1. In addition to cavitation under such above conditions, ultraviolet treatment of the process stream can also be utilized.

Ultraviolet treatment of water for the purpose of water purification is described in U.S. Pat. Nos. 4,906,387 and 4,990,260, the entire disclosures of which are incorporated herein by this reference. However, the ultraviolet source of the above inventions were conventional low pressure mercury lamps. These lamps produce resonance radiation at 253.7 and 185.0 nm. Their disadvantage is that the mercury sources are relatively low intensity because the process by which a photon is emitted from an excited atom is reversible; i.e., mercury atoms will begin to reabsorb radiation as the input energy is increased.

The high energy ultraviolet reactor 32 could employ a Xenon flash lamp. The Xenon flash lamp produces a unique source of high intensity, high energy ultraviolet radiation over a significant range of the spectrum (185 to 330 nm). For example, at approximately 230 nm, the Xenon flash lamp produces about 375 times more relative intensity than a low energy Hg lamp; and at 253.7 nm, the Xenon flash lamp produces approximately 8 times more relative intensity than the low energy Hg lamp.

The use of this cavitation oxidation system with ultraviolet treatment of the water permits the ultraviolet lamp protective quartz tubes to be essentially safe from scaling problems. Langelier's Index of Scaling is shifted negative by the cavitation process.

The residence time of the process stream in the ultraviolet reactor is also a parameter in the management of the process stream. Residence time is the period of time that is required for a specific component of the contaminant stream to move into and out of the ultraviolet reactor. Residence time directly affects the amount of ultraviolet radiation received by each specific component of the contaminant stream. Residence time is allowed to vary from one minute to twenty minutes in the operating protocols of this invention. Generally, residence time is a direct function of the volume of the ultraviolet reactor divided by the flow in gallons per minute. Residence time can be directly affected by the amount of cavitation recycle being used, which is itself controlled by the recycle valve setting. Following either low energy ultraviolet or high energy ultraviolet treatment, the water stream can be treated further by ion exchange device 34. As a particular example of ion exchange, sodium ions can be exchanged for calcium ions in the water to improve its "softness." From the ion exchanger, the water passes to the end uses represented by storage 16. Valve 36 controls the flow through the ion exchanger, while valve 38 controls alternative flow through degassifier 40 and filter 42. These latter treatments might be more useful in some water flow circumstances where gases and/or particulates are produced by the cavitation and/or the high energy Xenon pulse ultraviolet purification.

Figure 3:
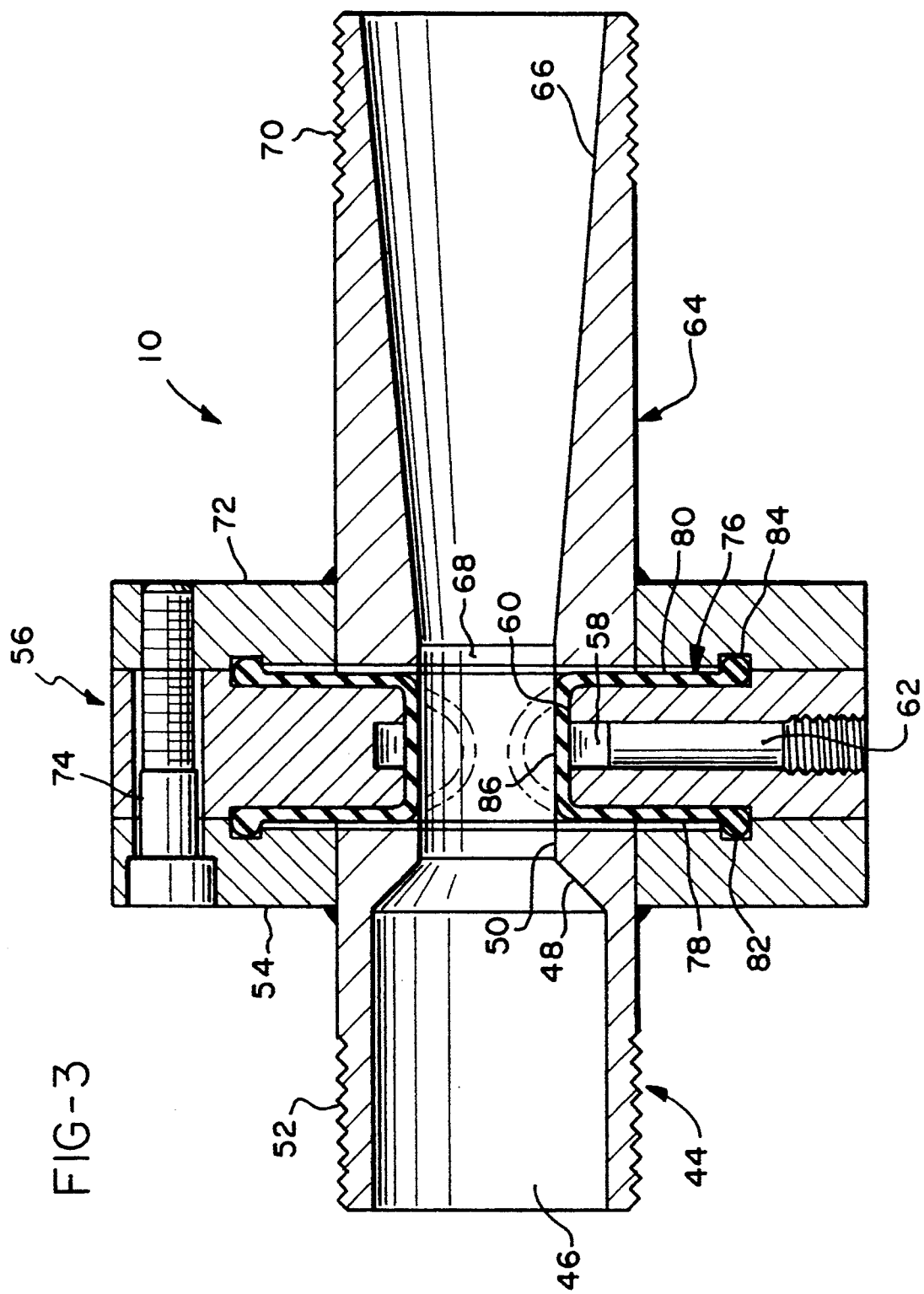
FIG. 3 is a longitudinal section through a preferred embodiment of the cavitation nozzle used in association with the system of this invention.

The structural detail of the cavitation nozzle 10 is shown in longitudinal section in FIG. 3. Inlet body 44 is a tube having an inlet passage 46 which converges in a cone 48 which defines the inlet throat 50. The exterior of the inlet body 44 has attachment means thereon such as threads 52 or other connecting means. The inlet body also carries inlet body flange 54, which is welded or otherwise secured thereto. Throat body 56 lies against flange 54. The throat body is a flat annular disc which is externally the same size as the flange 54. The throat body carries an annular channel 58 therein around its inner opening defined by inner wall 60. Port 62 connects the annular channel 58 to exterior connection.

Outlet body 64 is a tubular body having an interior tapered expansion wall 66, which extends from the outlet throat 68 to the right-hand outer end of outlet body 64. The outlet throat 68 is the same diameter and is in alignment with the inlet throat 50. The large end of the expansion wall 66 is essentially the same diameter as inlet passage 46. Attachment means on the outlet body 64 permit its attachment into a hydraulic system. Threads 70 are an example. The outlet body 64 is secured in the nozzle by means of flange 72 welded to the outlet body. Flanges 54 and 72 are clamped together with the throat body 56 therebetween by a plurality of bolts, one of which is indicated at 74.

The throat of cavitation nozzle 10 is variable. This is accomplished by means of threat member 76. The throat member 76 is annular in plan and is U-shaped in cross section. The throat member is made of a resilient elastomeric material, such as Viton, which is resistant to attack by the water to be delivered through the nozzle 10 and its contaminants. The throat member 76 includes circular rings 78 and 80, which respectively terminate in O-rings 82 and 84. The O-rings 82 and 84 are respectively received in O-ring grooves and flanges 54 and 72, both to seal the flanges with respect to the throat body and to seal the throat member 76 with respect to the throat body. The throat body is of reduced thickness to receive the rings 78 and 80 and to permit them some expansion space for resilient deflection. The rings of the, throat member are joined by variable throat 86 which, together with rings 78 and 80, define the U-shaped cross section of the throat member. The throat member is molded in one piece. Thus, the various parts thereof are integrally joined.

When the cavitation nozzle 10 is placed in a system such as a system 14, the air pressure into port 62 can control the throat diameter by distending or contracting the throat 86. A reduced throat is achieved, such as indicated by dot-dash lines in FIG. 3. Other configurations are useable in this invention, such as a variable aperture similar to that used in a camera lens or a tapered rod movable into and out of the annulus of the throat thereby controlling throat area. When water is delivered through the cavitation nozzle 10 under the proper conditions, cavitation is produced. Cavitation is caused by dynamic pressure reduction at essentially constant temperature. Cavitation involves the entire sequence of events beginning with bubble formation and extending through cavity collapse. The bubble growth will be explosive if it is primarily the result of vaporization in the cavity. Cavitation is produced by a critical flow cavitation nozzle. Cavitation effectiveness varies with throat diameter, nozzle surface finish, dissolved air in the liquid, liquid flow and pressure drop across the nozzle. The cavitation nozzle 10 has a variable throat which is controlled by feedback from various sensors, as described hereinafter, to optimize cavitation. The cavitation phenomenon which results in the formation and collapse of micro-bubbles is contained in the expanding diameter outlet body. The cavitation is directly influenced by the pressure differential between the inlet and outlet of the cavitation nozzle 10. Decreasing the throat diameter will increase the pressure differential across the throat and increase the length of the stream that is cavitating. This increases the number of nucleation sites at which cavitation begins and extends the length of the cavitating flow.

The cavitation of water with dissolved organic chemicals produces both strong reductants and oxidants and is capable of causing secondary oxidation and reduction reactions. Free radicals are generated by cavitation. The free radicals are principally hydrogen atoms $H^+$ and hydroxyl radicals $OH^-$. The free radicals are generated by the cavitation and are maintained by a combination of cavitation, seeding with other constituents, and subsequently ultraviolet excitation. Organics, living organisms and some inorganics can be treated. When the waste stream includes organic waste, the waste is oxidized into carbon dioxide, water and sulfates by the available free radicals. Usually the waste stream, particularly when it is contaminated ground water or waste water, contains unknown organic chemicals. However, the free radicals resulting from the cavitation causes oxidation reactions to varying degrees in all organic materials.

Living organisms such as salmonella and E. Coli are destroyed when their cells' outer protective shell and cell wall rupture after cavitation. Since bacterial aerobic metabolism reduces fluid alkalinity (U.S. Pat. No. 5,013,442), destroying bacteria raises the alkalinity, and thus provides a measurement detectable by a sensor to evaluate the effectiveness of the cavitation process when processing bacteria and other living organisms. Suitable sensors can react to the changes in chemical characteristics in the stream and, through suitable transducer and programmable controller, can control the inlet pressure to the cavitation nozzle and its throat diameter to reach an optimum steady state cavitation flow and, as a result, reduction in contaminants.

Cavitation is very useful in the breakdown of organic chemicals. In cavitated water, ... the heat from cavity implosion decomposes water into extremely reactive hydrogen atoms and hydroxyl radicals. During the quick cooling phase, hydrogen atoms and hydroxyl radicals recombine to form hydrogen peroxide and molecular hydrogen. If other compounds are added to the water... a wide range of secondary reactions can occur. Organic compounds are highly degraded in this environment and inorganic compounds can be oxidized or reduced.

(Scientific American, Feb. 1989, p. 84).

In other cavitation experiments, the temperature of collapsing bubbles has been determined experimentally to be about 5000 degrees K. This high temperature provides insight to the efficacy of the cavitation process for breaking down complex organic compounds (Science, 20 September 1991, Vol. 253, p. 1397).

Figure 2:
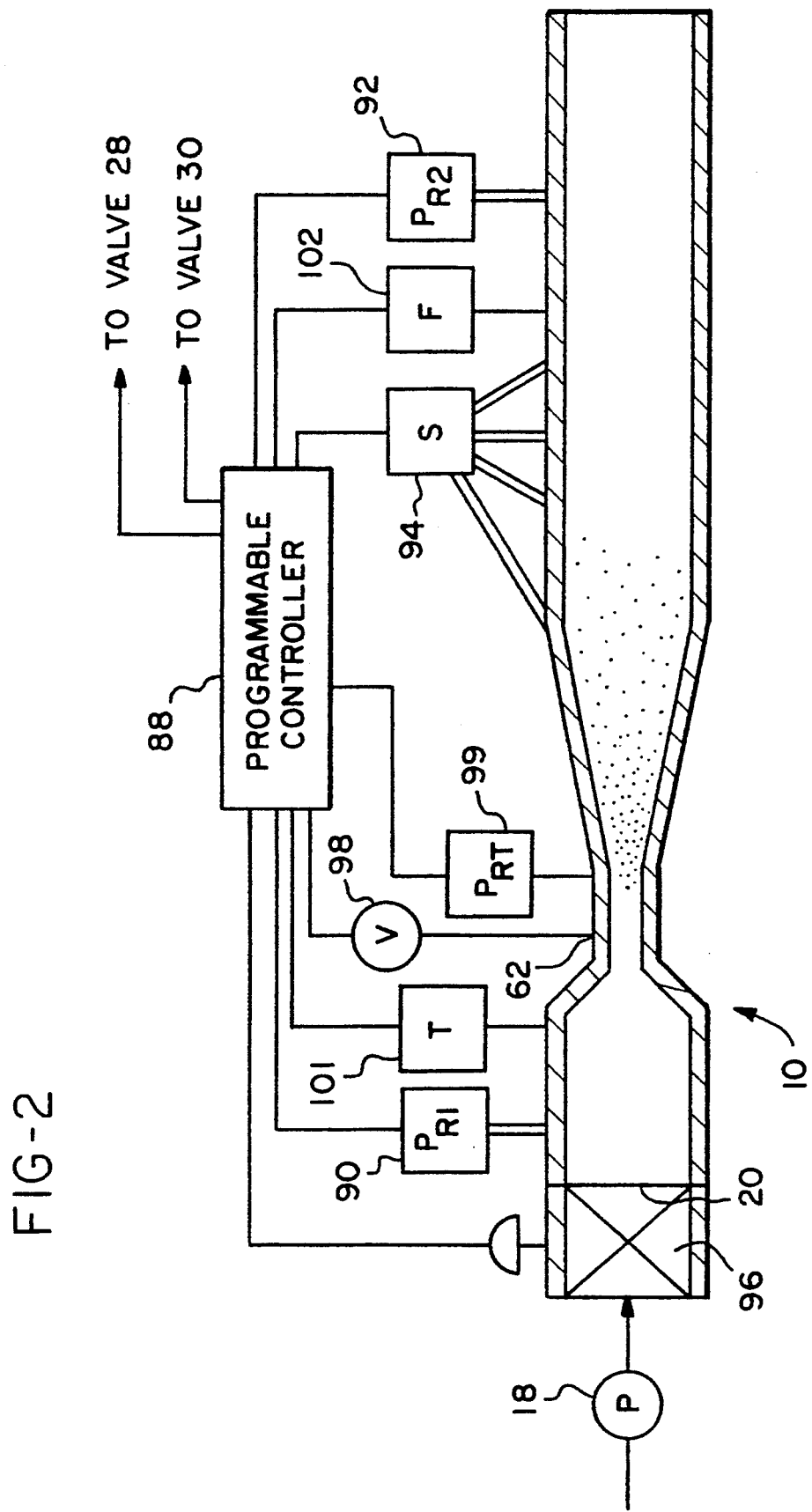
FIG. 2 is a longitudinal section through a substantially schematically depicted variable throat cavitation nozzle in association with its sensors and controls.

The variable cavitation nozzle thus provides an additional control for optimizing the cavitation process. Referring to FIG. 2, the sensing and control associated with the cavitation nozzle 10 are shown. Controller 88 is programmable and receives inlet and outlet pressure signals from inlet and outlet pressure transducers 90 and 92. It receives throat vacuum measurements from throat vacuum transducer 99, inlet temperature from inlet temperature transducer 101, and flow data from flow transducer 102. It also receives other signals from sensor and transducer 94. These signals may be chemical constituent concentration signals which indicate the effectiveness of the cavitation process in oxidizing contaminants at existing settings and conditions.

The controller 88 controls both the inlet valve 96 to control total flow through the cavitation nozzle and controls the pressure output of pump 18 at the inlet to the nozzle. The programmable controller also controls valve 98 which controls the fluid pressure to port 62 and thus controls the throat diameter. The controller 88 could be equally effective in a case of a fixed nozzle cavitation system wherein a number of inputs to the controller 88 from inlet pressure 90, outlet pressure 92, vacuum 99, temperature 101, and flow 102 produce signals to pump 18 and valve 96 to control cavitation to provide an optimum process.

There are a number of sensors and transducers 94 available to further control the process. The sensors range from simple temperature gauge and pH meters to flow rate, vacuum indicator, conductivity meters, dissolved oxygen meters, oxidation reduction potential meters, BOD (Biological Oxygen Demand) monitors, etc. For example, in tannery waste water removal rates of TOC (Total Organic Carbon), COD (Chemical Oxygen Demand) and protein content are inter-dependent. In the presence of an initiator such as hydrogen peroxide, sulfides are removed which instantly lowers the pH of the waste stream. This drop in pH gives immediate indication of the effectiveness of the cavitation nozzle.

In an actual ground water remediation project at an abandoned gasoline service station, the initial flow from underground pumps to a manifold preceding the purification system with a fixed nozzle was approximately 10 gpm. After several months of unattended operation, flow reduced to about 5 gpm. At these flow rates, the fixed nozzle was at the low end of its effectiveness. Subsequently, flow dropped further to about 1 gpm as the contaminated ground water was depleted. A variable nozzle with its attendant feedback control would have provided optimum performance of the cavitation process over these wide ranges of flow. Given below are examples of other specific treatments. In all examples following, no pretreatment process was employed.

With a 0.141 inch throat nozzle in a Laboratory Test Cavitation Unit, using a known dosage of phenol, the maximum flow rate possible to reduce the phenol from 16 ppm to 6 ppm was 0.75 gpm. In the same test, substituting a 0.375 inch throat nozzle, the flow rate was increased to 5 gpm and the phenol concentration reduced to less than 4 ppm, thereby demonstrating the optimization of the cavitation process. Other conditions were constant. Recycle and ultraviolet were used.

EXAMPLE 2

With a 0.141 inch throat nozzle in a Laboratory Test Cavitation Unit, a salmonella inoculation of 238,000 CFU/ml was reduced 85 percent at a flow rate of 0.95 gpm. Optimizing the cavitation process through substituting a 0.238 inch throat nozzle, a salmonella inoculation of 2,300,000 CFU/ml was reduced by a 99.999 percent (or eight magnitudes) at a flow rate of 0.95 gpm. Other conditions were constant. Recycle, ultraviolet and 60 ppm hydrogen peroxide were used.

The following examples are without ultraviolet irradiation, without hydrogen peroxide addition, without catalyst addition, and without preheat or pretreatment. In each of the following tests, analysis was performed by a Shimadzu GC-14A Gas chromatograph employing EPA method 8021. The numbers given are percent reduction in the particular contaminant.

EXAMPLE 3

The tests of Example 3 were performed with the following parameters:

| d (throat diameter) = | .375 |
| --- | --- |
| $P_1$ (inlet pressure) = | 70 psi |
| $T_1$ (inlet temperature) = | 22 degrees C. |
| $P_t$ (throat pressure) = | 26" Hg |
| $P_2$ (outlet pressure) = | 8 psi |
| Flow = | .25 gpm |
| Dwell Time = | 30 minutes |
| Recycle ratio = | 100:1 |
| pH = | 7.0 |
| TCE = | trichlorethylene |

| Test no. | Benzene | Ethyl Benzene | Toluene | Xylene | TCE % | Initial TCE Concen PPM |
| --- | --- | --- | --- | --- | --- | --- |
| 1 | 57% | 11% | 37% | + | 65% | 1850 |
| 2 | 54% | 39.6% | 52% | 51% | 60% | 1680 |
| 3 | 41% | 71% | 49% | 59% | 45% | 1860 |
| 4 | 32% | 20% | 43% | ND | 41% | 1680 |

EXAMPLE 4

The tests of Example 4 were performed with the following parameters:

| d (throat diameter) = | .375 |
| --- | --- |
| $P_1$ (inlet pressure) = | 65 psi |
| $T_1$ (inlet temperature) = | 24 degrees C. |
| $P_t$ (throat pressure) = | 25" Hg |
| $P_2$ (outlet pressure) = | 7 psi |
| Flow = | 1.5 gpm |
| Dwell Time = | 10 minutes |
| Recycle ratio = | 17:1 |
| pH = | 5.0 |

| Test no. | Benzene | Ethyl Benzene | Toluene | Xylene | TCE % | Initial TCE Concen PPM |
| --- | --- | --- | --- | --- | --- | --- |
| 1 | 37% | 44% | 38% | 38% | 38% | 1620 |
| 2 | 37% | 43% | 37% | 37% | 37% | 1620 |
| 3 | 40% | ND | 55% | ND | 33% | 993 |

EXAMPLE 5

In this example, the operating parameters did not include any dwell time before testing. The following conditions were present:

| d (throat diameter) = | .375 |
| --- | --- |
| $P_1$ (inlet pressure) = | 60 psi |
| $T_1$ (inlet temperature) = | 22 degrees C. |
| $P_t$ (throat pressure) = | 24" Hg |
| $P_2$ (outlet pressure) = | 6 psi |
| Flow = | 10 gpm |
| Dwell Time = | 0 minutes |
| Recycle ratio = | 2.5:1 |
| pH = | 7.0 |

| Test no. | Benzene | Ethyl Benzene | Toluene | Xylene | TCE % | Initial TCE Concen PPM |
| --- | --- | --- | --- | --- | --- | --- |
| 1 | 23% | 54% | 31% | 38% | 24% | 1860 |
| 2 | 17% | 60% | 26% | 42% | 22% | 1860 |
| 3 | 19% | 53% | 26% | 35% | 19% | 1860 |
| 4 | 16% | 24% | 20% | 23% | 18% | 1680 |

Operating parameters for a 3 gpm Pilot Test Unit for contaminants such as benzene, ethyl benzene, toluene, xylene and trichloroethylene, using only a cavitation chamber and no hydrogen peroxide, no ultraviolet radiation, and with a 0.375 diameter throat were determined to be most effective at a flow of 0.25 gallons per minute followed by a dwell time of 30 minutes and a recycle ratio of 100:1 before discharge (and sample testing). A percent reduction value of 65 percent was obtained under these conditions.

However, economic considerations might dictate a higher flow, less dwell time and accept a lower but still adequate, percent reduction, thereby reducing the cost of the operation. Thus, in these examples, increasing the flow by a factor of 6 from 0.25 to 1.5 gallons per minute by adjusting the variable throat would result in a range of TCE contaminant reduction from 65 percent to 38 percent.

From these tests, it is clear that dwell is necessary to permit the reactions to proceed before testing takes place. In Example 5, the dwell time is zero, while in Example 3, it is 30 minutes. Reductions in trichlorethylene were only in the range of 20 percent in Example 5, while they reached the range of 65 percent in Example 3. Reductions in dissolved benzene were similar. The figure for concentration (ppm) of trichlorethylene is in the inlet process stream.

From these examples, it can be seen that successful results are obtained with cavitation only operation, with no ultraviolet radiation, no hydrogen peroxide, no catalysts, no preheat. It can be seen that the preferred operating ranges for a 3 gallon per minute Pilot Test Unit are:

| $P_1$ (inlet pressure) = | 50–75 psi |
| --- | --- |
| $T_1$ (inlet temperature) = | 15–25 degrees C. |
| $P_t$ (throat pressure) = | 25–29" mercury below atmospheric |
| $P_2$ (downstream pressure) = | 5–12 psi |
| Flow rate = | 0.25–10.0 gpm |
| Dwell Time = | 0–60 minutes |
| Residence time = | 0–15 minutes |
| pH = | 5.0–8.0 |

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A water remediation and purification system apparatus comprising:
means for pressurizing contaminated water, said means for pressurizing contaminated water being connected to a source of contaminated water having dissolved contaminants therein;
a variable area cavitation nozzle;
a nozzle area controller means, said nozzle area controller means being connected to control the opening of said variable throat and to cause cavitation in the contaminated water, said cavitation nozzle being connected to receive pressurized contaminated water from said source of pressurized contaminated water, said cavitation nozzle having an inlet body, a throat body and an outlet body, said inlet body having a passage therein and being connected to said means for pressurizing contaminated water, said throat body being connected to said inlet body and said throat body having a throat therein of reduced area with respect to said inlet body so that low pressure is produced in said throat body in contaminated water passing at high velocity through said throat, said throat body being connected to said outlet body, said outlet body having a divergent end to form an expansion passageway in which cavitation takes place so that cavitation encourages remediation reactions in contaminants in the water flowing through said nozzle; and
sensor means connected to said cavitation nozzle before and after said throat, said sensor means being connected to said controller means to optimize the cavitation process and maximize the chemical dissociation of the dissolved contaminants in the water stream.

2. The system apparatus of claim 1 wherein said throat body is substantially circular and defines a substantially circular throat therethrough.

3. The system apparatus of claim 1 further including a high energy ultraviolet reactor having high energy ultraviolet quartz tubes and being connected to said nozzle outlet body to receive cavitated water from said cavitation nozzle to further purify the contaminated water in its flow toward end use and said cavitation nozzle is operated to minimize deposition of scaling materials from the water onto said high energy ultraviolet quartz tubes.

4. A water remediation and purification system apparatus comprising:
means for pressurizing contaminated water, said means for pressurizing contaminated water being connected to a source of contaminated water having dissolved contaminates therein;
a variable area cavitation nozzle;
a nozzle area controller means, said nozzle area controller means being connected to control the opening of said variable throat and to cause cavitation in said contaminated water, said cavitation nozzle being connected to receive pressurized contaminated water from said source of pressurized contaminated water, said cavitation nozzle having an inlet body, a throat body and an outlet body, said inlet body having a passage therein and being connected to said means for pressurizing contaminated water, said throat body being connected to said inlet body and said throat body having a throat therein of reduced area with respect to said inlet body passage so that low pressure is produced in said throat in contaminated water passing at high velocity through said throat, said throat body being connected to said outlet body, said outlet body having a divergent end to form an expansion passageway in which cavitation takes place so that cavitation encourages remediation reactions in contaminants in the water flowing through said nozzle; and
means for further processing contaminated water connected to said outlet body, said means for further processing contaminated water including a dwell tank to permit cavitated water to dwell therein.

5. The water remediation and purification system apparatus of claim 4 wherein said means for further processing contaminated water includes an ultraviolet reactor including an ultraviolet lamp shielded by a quartz tube, connected to receive water from said dwell tank to further purify the contaminated water in its flow toward end use.

6. A water remediation and purification system apparatus comprising:
means for pressurizing water, said means for pressurizing water being connected to a source of contaminated water having dissolved contaminants therein;
a cavitation nozzle, said cavitation nozzle being connected to receive pressurized contaminated water from said means for pressurizing water, said cavitation nozzle having throat means therein for producing cavitation in the contaminated water delivered therethrough;
sensor means for sensing conditions in the contaminated water upstream and downstream of said cavitation nozzle, said sensor means being connected to a controller, said controller means being connected to said means for pressurizing water for controlling the pressure and flow rate of water to said cavitation nozzle so that the pressure and flow rate can be controlled to optimize cavitation treatment of contaminated water flowing through said nozzle.

7. The system apparatus of claim 6 further including a recycle line connected between the outlet of said cavitation nozzle and said means for pressurizing water to permit recycling of water through said cavitation nozzle and a recycle valve in said recycle line, said valve being connected to said controller means so that recycling of contaminated water is also controlled by said controller means.

8. The system apparatus of claim 7 further including a dwell tank in said recycle line to permit cavitation induced impurity reactions to continue before water flowing reaches said recycle valve.

9. The system apparatus of claim 6 wherein said system apparatus is configured to operate in the ranges of:
$P_1$ (inlet pressure) = 50–75 psi
$T_1$ (inlet temperature) = 15–25 degrees C.
$P_t$ (throat pressure) = 25–29" mercury below atmospheric
$P_2$ (downstream pressure) = 5–12 psi
Flow rate = 0.25–10.0 gpm
Dwell Time = 1–60 minutes
Residence time = 1–15 minutes
pH = 5.0–8.0.

* * * * *